United States Patent [19]

Mausgrover

[11] 4,246,113

[45] Jan. 20, 1981

[54] APPARATUS AND METHOD FOR REMOVING OIL CONTAMINANTS FROM WASTE WATER

[75] Inventor: Robert H. Mausgrover, Harrisburg, N.C.

[73] Assignee: Ultracept, Inc., Charlotte, N.C.

[21] Appl. No.: 60,655

[22] Filed: Jul. 25, 1979

[51] Int. Cl.³ .............................................. B03D 3/00
[52] U.S. Cl. .................................. 210/115; 210/124; 210/187; 210/195.1; 210/258
[58] Field of Search ................... 210/83, 84, 104, 114, 210/115, 124, 167, 258, 540, 187, 195 A

[56] References Cited

U.S. PATENT DOCUMENTS

| | | | |
|---|---|---|---|
| 2,782,929 | 2/1957 | Colket | 210/540 X |
| 2,879,894 | 3/1959 | Nelson | 210/540 X |
| 3,862,039 | 1/1975 | Sommers | 210/540 X |
| 3,862,040 | 1/1975 | Preus | 210/540 X |
| 3,907,682 | 9/1975 | Basseet | 210/114 |
| 3,996,136 | 12/1976 | Jakubek | 210/114 |
| 4,132,645 | 1/1979 | Bottomley | 210/540 X |

Primary Examiner—John Adee
Attorney, Agent, or Firm—Bell, Seltzer, Park & Gibson

[57] ABSTRACT

A plurality of compartments are provided, including intercommunicating first and second oil-water separation compartments, each provided with respective drains therein and wherein the flow of water from the first to the second compartment is restricted so as to increase the residence time of the water in the first compartment for increasing the separation of oil therein. The mouth of the drain in the first compartment is positioned higher than the mouth of the drain in the second compartment and so located as to be above the surface of the water when the first compartment is substantially filled with water so as to accommodate a layer of oil floating on the surface of the water so that only oil will flow into the drain and thus be removed from the water virtually free of any water mixed therewith. The second compartment serves as a discontinuous oil skimming compartment and to this end when the water rises to the level of the mouth of the drain therein, the water flows therefrom into the drain for thus skimming the oil floating on the surface of the water. Water discharge means, such as a pump, intermittently removes water from the second compartment. Water level sensing means is associated with the pump for sensing the rising of the water to the height of the mouth of the drain in the second compartment and in turn actuates the pump to draw the water down to a predetermined lower level below the mouth of the drain.

17 Claims, 18 Drawing Figures

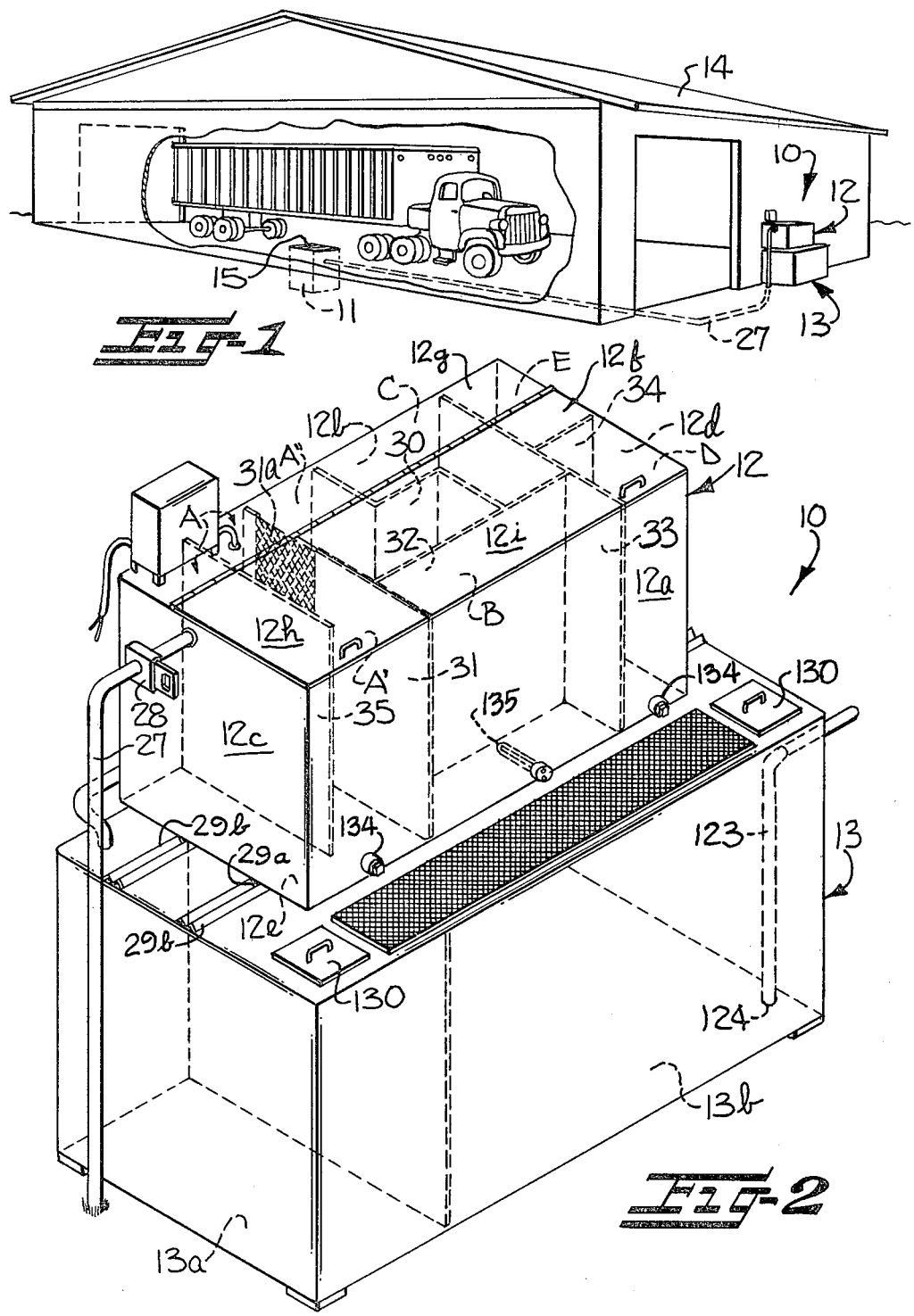

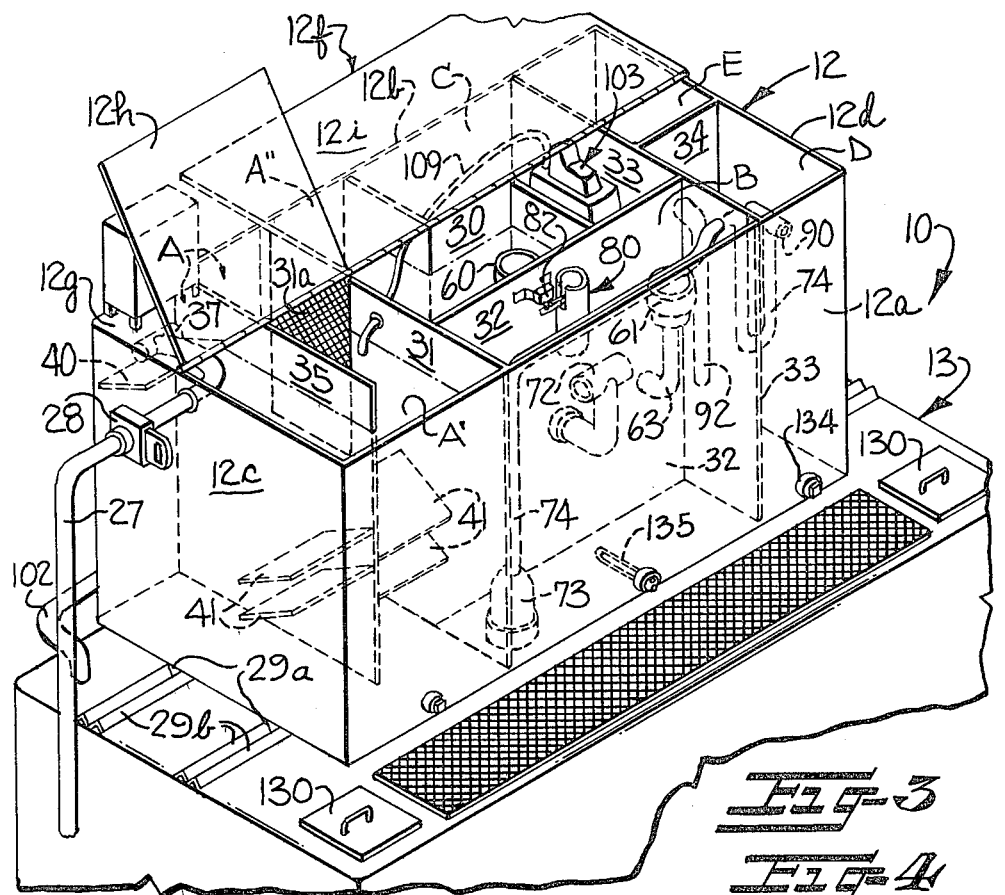
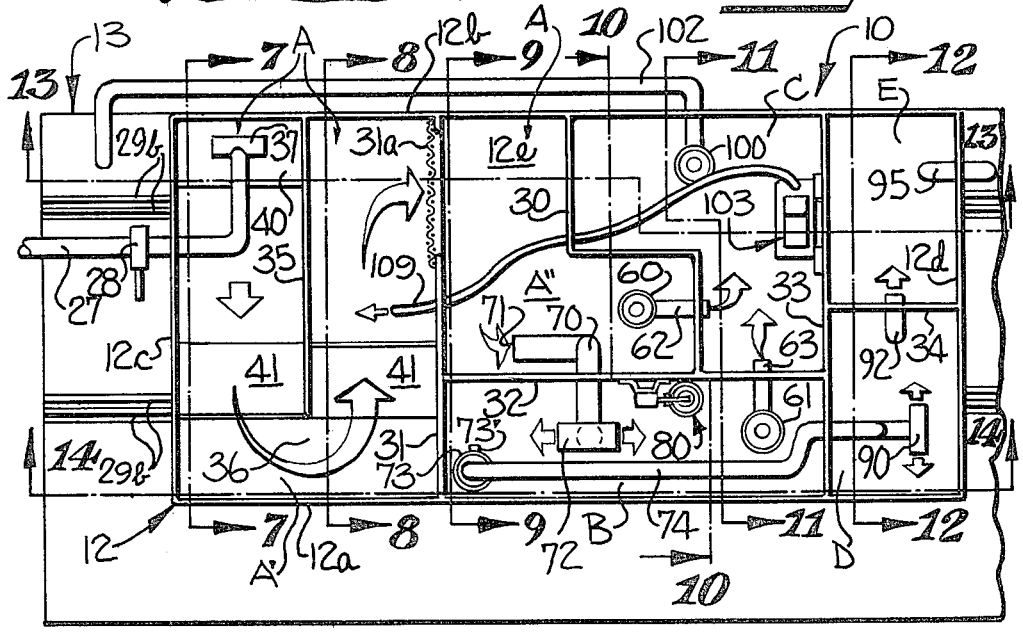

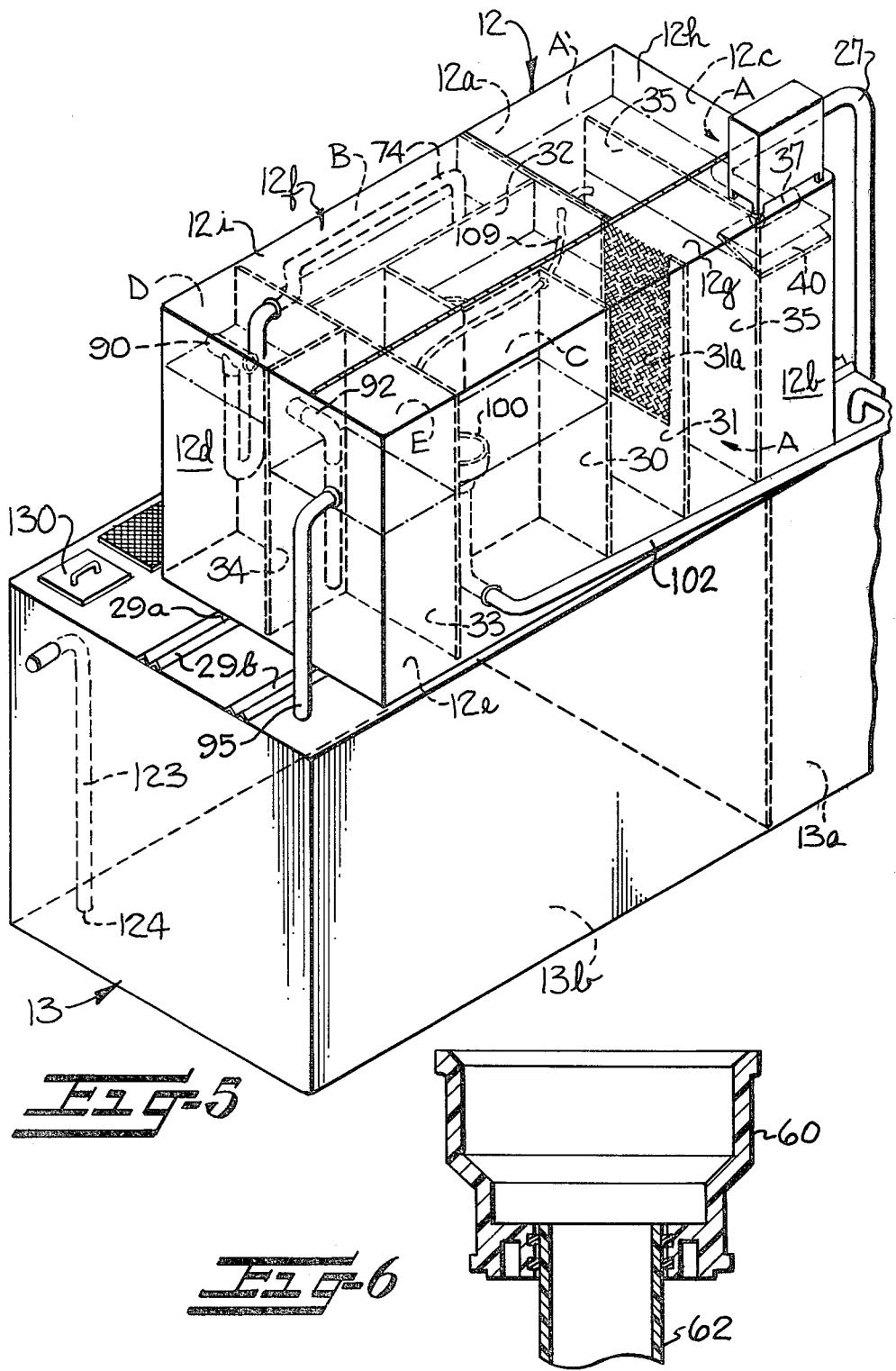

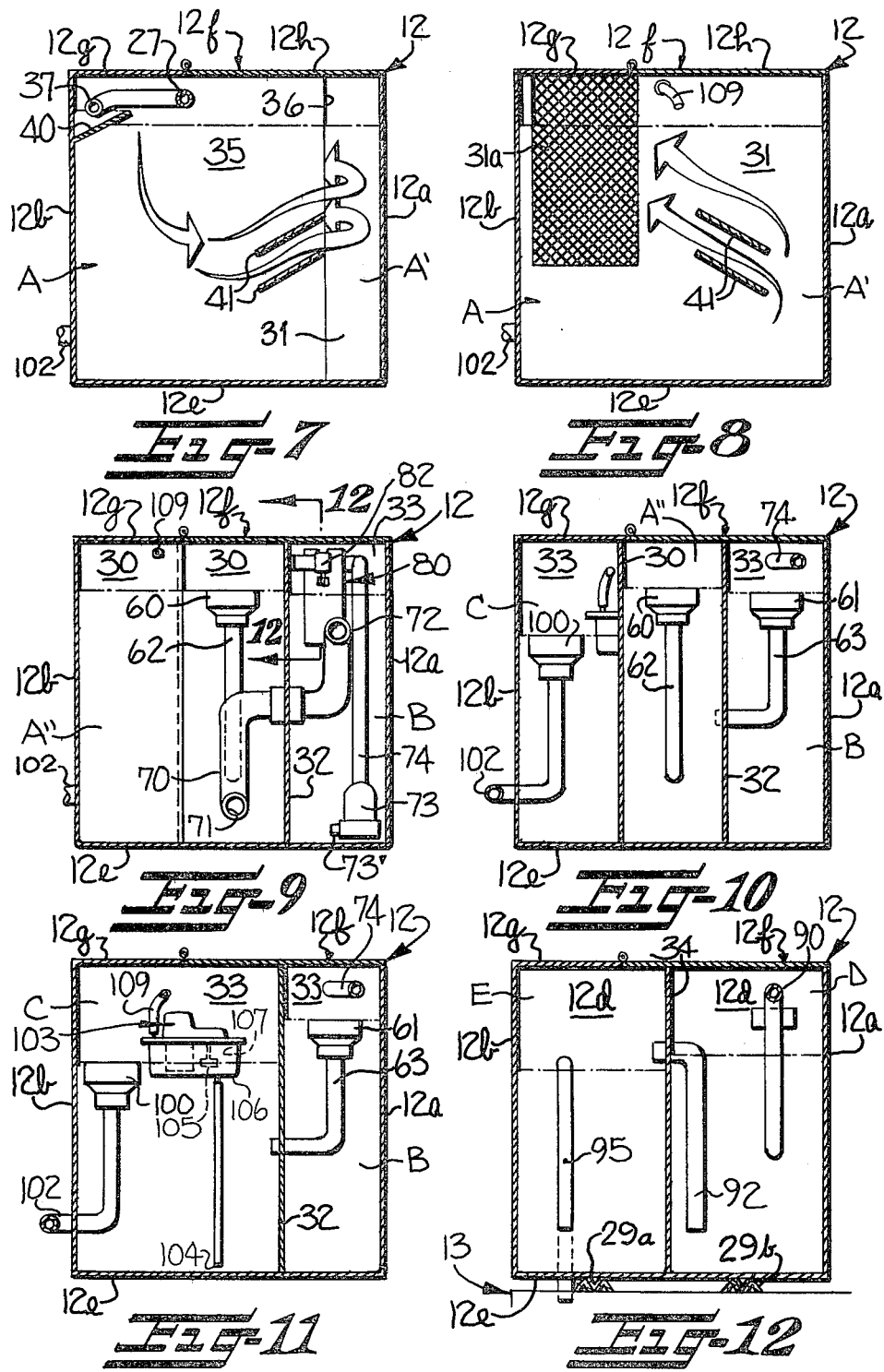

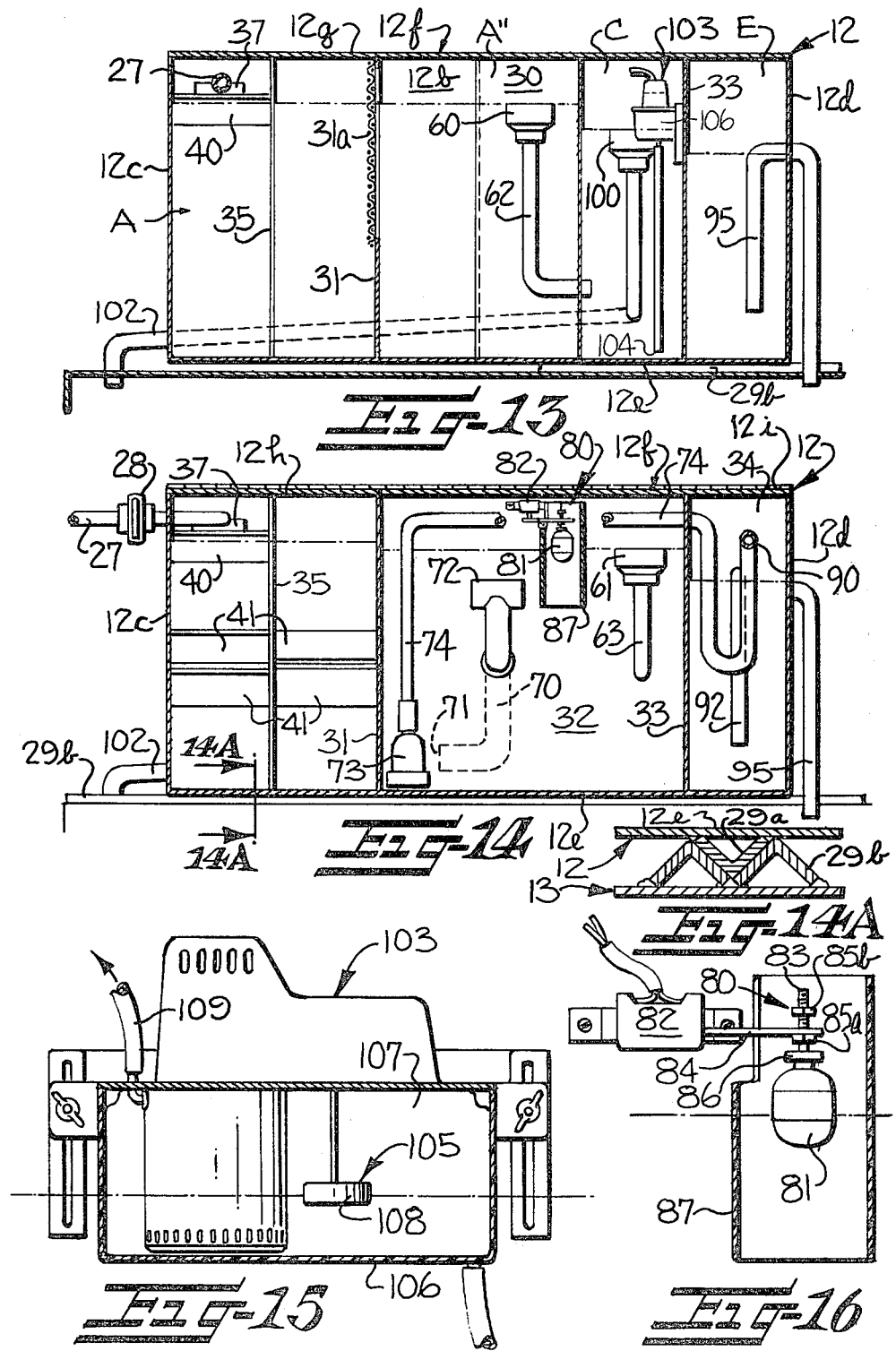

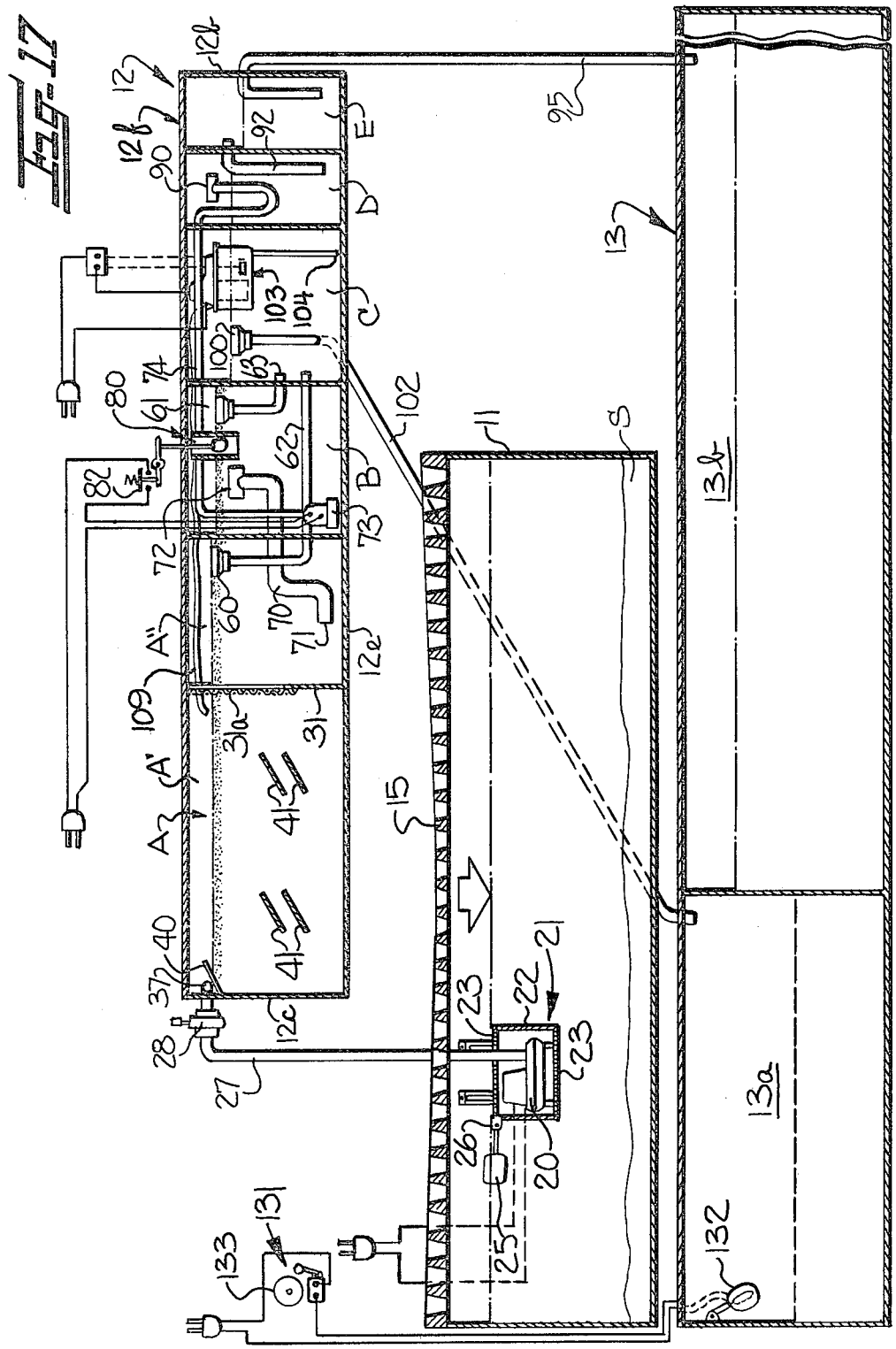

APPARATUS AND METHOD FOR REMOVING OIL CONTAMINANTS FROM WASTE WATER

FIELD OF THE INVENTION

The present invention relates to an improved apparatus and method for removing pollutants from waste water and particularly pertains to the separation and removal of oil, grease, and similar contaminants from waste water such as is discharged in industrial cleaning operations. More specifically, the invention is concerned with an apparatus and method for separating and removing oil from water by making use of the difference in densities of the oil and water to permit gravitational separation of the oil and water, and for draining the lighter density oil from the surface of the water without including substantial quantities of water intermixed with the thus drained oil.

BACKGROUND OF THE INVENTION

Water used in industrial processes and cleaning operations is frequently contaminated with oil, grease, and similar substances and discharged as waste. Particularly in such service industries as automotive and truck repair and servicing operations, water is often used to flush oil and grease from the work area and equipment, and heretofore, it has been the usual practice to dump the effluent into natural streams or rivers or to discharge the effluent directly into the local public drainage or sewer system. With increasing concern for the environment, dumping of contaminated water has been substantially halted, and also, it has been found to be equally undesirable to discharge the waste water directly into sewer systems. Although sewage is frequently treated to remove pollutants so that the water can eventually be reused, the heavy concentration of oil and grease in waste water from industrial cleaning operations makes it difficult to process the effluent in typical treatment facilities so that quality standards can be met. Accordingly, it has become necessary to purify the waste water produced in commercial operations so as to remove substantially all of the oil from the waste water before it is discharged into a public sewage system. In fact, applicable governmental regulations now require removal of oil from waste water in many instances, and more particularly, the Environmental Protection Agency has promulgated regulations establishing standards for acceptable oil content in waste water prior to discharge of such waste water into a public treatment system.

Various attempts have been made heretofore to remove oil, grease, and other similar substances from waste water by making use of the differences in density of oil and water to permit gravitational separation of the oil and water to facilitate removal of the oil from the surface of the water. For example, as illustrated in U.S. Pat. No. 3,862,039 to Summers and U.S. Pat. No. 2,782,929 to Colket, a typical oil-water separator includes a settling tank or compartment into which waste water is admitted and collected for separation and removal of the oil from the water. While the waste water is within the settling tank, the waste water gradually separates into oil and water constituents with the less dense oil floating to the upper surface of the waste water. The upper layer or portion of the waste water, being the most heavily laden with oil, is then removed from the body of the waste water by a "skimming" operation.

In oil-water separators of the type disclosed in the Summers and Colket patents, removal of the oil is accomplished by positioning a drain or outlet at a fixed elevational location within the settling tank so as to continuously drain or skim the uppermost layer of waste water from the body of the waste wear. Consequently, the drain skims substantial quantities of water off the waste water along with the oil, because of variations in the concentration of oil present in the waste water and/or variations in the rate at which waste water is admitted to the settling tank. This removal of water intermixed with oil presents petroleum with collection and storage of the oil thus removed, because it frequently happens that such large quantities of water are removed with the oil that storage capacity for the oil is quickly exhausted, thus requiring frequent drainage of the oil storage facility. Additionally, if the oil storage facility is not drained but allowed to fill to capacity, oil can back up within the oil-water settling tank and eventually pass through the same with the water.

Other attempts to remove oil from the waste water appear to have increased the problem of substantial quantities of water remaining mixed with the oil. For example, the positioning of more than one drain within a settling tank or compartment, as shown in U.S. Pat. No. 4,119,541 to Makaya, has been proposed to reduce the oil content in the processed water, but even greater amounts of water were removed with the oil, because the upper layer of waste water was skimmed into all the drains. Likewise, it has been proposed to provide a second settling tank or compartment into which the water from the first tank is admitted. The second settling tank also includes an oil drain, and both drains are positioned so that the upper layer of waste water is continuously drained during the processing of the waste water. However, while additional oil is removed in the second settling tank, large quantities of water are still drained with the oil, presenting the storage problems mentioned above.

SUMMARY OF THE INVENTION

IT is accordingly an object of the present invention to provide an apparatus and method for removing oil and other similar contaminants from waste water without substantial quantities of water being intermixed with the removed oil.

Another object of the present invention is to provide an improved oil-water separator which is so constructed as to remove substantially all of the oil from the waste water being processed so that the oil is sufficiently purged from the water to permit discharging such water into a public sewage system or recycling the water for subsequent use.

A further object of the present invention is to provide an improved oil-water separator wherein a series of successive compartments are provided, including first and second oil-water separation compartments and wherein the first compartment is so arranged as to permit the separation therein of most all of the oil contaminant in the waste water and to collect the same on the surface of the water therein and to remove the same through a drain with substantially no water intermixed therewith. The second oil-water separation compartment restrictively receives the flow of water from the first compartment and serves as a discontinuous oil skimming compartment and wherein water discharge means, such as a pump, is associated therewith and is actuated periodically upon the height of the water in the second compartment rising to the height of and flowing into the mouth of the drain associated therewith.

According to the preferred embodiment of the apparatus for carrying out the method of the invention, a housing is provided which defines a plurality of compartments therein including intercommunicating first and second oil-water separation compartments with means for introducing waste water into the first oil-water separation compartment, and wherein the first and second oil-water separation compartments are provided with respective drains therein. The mouth of the drain in the first compartment is positioned above the surface of the water in the first compartment and above the mouth of the drain in the second compartment, so that oil will accumulate on the surface of the water in the first compartment so the oil can be removed via the drain in the first compartment with minimal intermixed water. The first and second oil-water separation compartments are communicatively interconnected by conduit means restricting the flow of water from the first compartment to the second compartment so as to increase the residence time of the water in the first compartment for increasing the separation of oil therein, and water discharge means, such as a pump, is provided for discontinuously removing water from the second compartment upon the water flowing into the drain therein.

Water level sensing means is associated with the water discharge means for sensing the water being of a height so as to flow into the drain therein, and for periodically causing the water discharge means to draw the water down to a predetermined lower level below the mouth of the drain in the second compartment. The restricted flow of water from the first to the second compartment, the higher location of the mouth of the drain in the first compartment, as compared to the lower location of the drain in the second compartment, and the discontinuous removal of water from the second compartment result in obtaining a greater accumulation of oil in the first compartment and the removal of a greater amount of oil at that location, as well as an overall increase in residence time of the water in the compartments so as to thereby enhance overall removal of oil from the waste water with minimal water intermixed with the oil.

BRIEF DESCRIPTION OF THE DRAWINGS

Some of the objects and advantages of the invention having been stated, others will appear as the description proceeds, when taken in connection with the accompanying drawings, in which FIG. 1 is an environmental view of a waste water purification system embodying the features of the present invention, and illustrating the position of a sump within a service facility for collecting waste water;

FIG. 2 is a perspective view of the oil-water separator's main housing and auxiliary housing as shown in FIG. 1;

FIG. 3 is a perspective view of the oil-water separator's main housing;

FIG. 4 is a top plan view of the oil-water separator's main housing with the top wall removed and illustrating the flow of the waste water through the main housing;

FIG. 5 is a rear perspective view of the main housing and auxiliary housing, looking at the sides thereof opposite from the sides shown in FIG. 3;

FIG. 6 is a sectional view of one of the drains positioned within the oil-water separation compartments or oil collection compartment;

FIGS. 7, 8, 9, 10, 11 and 12 are transverse vertical sectional views through the main housing taken substantially along the respective lines 7—7, 8—8, 9—9, 10—10, 11—11 and 12—12 in FIG. 4;

FIGS. 13 and 14 are longitudinal vertical sectional views of the main housing taken substantially along the respective lines 13—13 and 14—14 of FIG. 4;

FIG. 14A is a sectional end view of the rails which aid in positioning the main housing on the auxiliary housing and taken substantially along the line 14A—14A of FIG. 14;

FIG. 15 is a side view of the pump positioned within the oil collection compartment;

FIG. 16 is a partially sectional view of the flotation switch within the second oil-water separation compartment; and FIG. 17 is a schematic diagram of the oil-water separator and illustrating the sequence in which the waste water flows through the separator.

DESCRIPTION OF THE ILLUSTRATED EMBODIMENT

Referring more specifically to the drawings, the preferred embodiment of the apparatus for carrying out the method of this invention for removing oil contaminants from waste water comprises an oil-water separator, broadly designated at 10, and which includes a sump 11 from which oil-containing waste water is conveyed to a main separator housing 12 as will be later described. The oil-water separator 10 comprises a main housing 12 positioned upon an auxiliary housing or storage reservoir means 13 defining two tanks or compartments 13a, 13b for respectively receiving therein separated oil and water for subsequent disposal after the waste water has been processed through the main separator housing 12. In a typical arrangement, it will be observed in FIG. 1 that the sump 11 is shown positioned within the floor of a motor vehicle service facility 14 so as to receive the waste water from the floor of the service facility and/or from the vehicles being serviced. However, the main separator housing 12 and the storage reservoir means 13 are placed in a remote location such as outside the service facility. Alternatively, the sump 11 may be located remotely from the service facility 14, if desired, and the waste water may then be drained or otherwise conveyed from the service facility 14 to the remotely located sump by a suitable arrangement of pipes and/or conduits.

As indicated above, the sump 11 is adapted to receive waste water as it runs off the trucks or other vehicles or objects being cleaned. As best shown in FIG. 17, the sump 11 is provided with a top wall means in the form of a grate 15 which may be a part of the floor of the facility 14. Thus, the waste water runs off the vehicles or objects being cleaned and flows through the grate 15 into the sump 11 as the grate prevents undesirably large objects from dropping into the sump. During the time that the waste water is being retained in the sump 11, it is apparent that heavier than water precipitates tend to gravitate and separate from the waste water and are deposited to accumulate upon the bottom or floor of the sump 11 as sludge for subsequent removal therefrom. Also, the oil which mixes with the water as it flows into the sump begins to separate from the waste water and float to the surface thereof.

Associated with the sump 11 is waste water discharge means comprising the sump pump 20 for removing the waste water from the sump. The pump 20 is mounted within the sump 11 in such a manner as to remove the waste water from a location below the surface of the water so that both separated oil and water will be discharged from the sump. Also, pump 20 is so located as to avoid distributing the sludge S deposited at the bottom of the sump. To this end, there is provided an open-ended basin 21 in which the pump 20 is positioned and which is mounted to one side wall of the sump 11 and substantially above the bottom of the sump 11 so that minimal quantities of sludge are drawn into the pump. The basin 21 includes solid side walls 22, and grates 23 cover the top and bottom of the basin whereby the pump 20 is entirely enclosed within the basin 21 with the pump retaining upon the lower grate 23. In operation, waste water is permitted to accumulate so that the level of the waste water will exceed the elevational position of the upper grate 23, and in this manner, the waste water will flow into the open space between the inner sides of the side walls 22 and the pump 20. Any oil that may gravitationally separate from the water while in the sump 11 is thereby removed by being drawn down through the upper grate 23 into the pump 20 while water is drawn up through the lower grate 23 into the pump. The grates 23 of the basin 21 also prevent large objects from entering the pump 20 and interfering with its operation.

The pump 20 is periodically actuated by waste water level sensing means, operably associated with the pump 20, and which causes the pump 20 to draw the waste water down to a predetermined relatively low level. The waste water level sensing means comprises a float 25 and an electrical switch 26 operably associated with the float. As the waste water level within the sump 11 rises, the float 25 rises therewith and operates the switch 26 in response to sensing a predetermined relatively high level of the water. Upon sensing such a predetermined high level, the float 25 causes switch 26 to close an electrical circuit to the pump 20 so the pump 20 then discharges the waste water until the level thereof returns to the aforementioned predetermined low level. The float 25 drops with the level of the waste water so the switch 26 is opened to stop operation of the pump when the predetermined low level is reached. In this manner, the waste water is discharged from the sump 11 only after a certain volume has accumulated therein.

From the sump 11, the waste water is directed to the main housing 12 wherein the oil gravitationally separates from the waste water and is removed from the upper surface of the water. Within the main housing 12 are a series of compartments in which the waste water is processed and through which the waste water sequentially flows as best illustrated in FIGS. 4 and 17. As shown, various walls and partitions provided in housing 12 define five compartments A–E in the housing 12, as will be later described more in detail. It should be noted, however, that although intermediate partitions to be later described, are shown in the compartment A in FIGS. 2–8, these intermediate partitions do not block or interrupt direct fluid communication between the various sections of the compartment A. Therefore, to all intents and purposes, the reference character A defines a single composite water settling and separation compartment which is divided into a waste water settling compartment A′ and a first oil-water separation compartment A″ which are in continuous communication with each other. The sump pump 20 propels the waste water from sump 11 to the main housing 12 through a conduit 27 interconnecting the outlet of the pump and the main housing 12. To control the rate at which waste water is admitted into the main housing 12, a manually adjustable flow control valve 28 is interposed in the conduit 27 between pump 20 and main housing 12.

The main housing 12 of the oil-water separator 10 is of substantially rectangular shape and includes front and rear side walls 12a, 12b, opposite end walls 12c, 12d, a bottom wall 12e and a composite top wall 12f including a fixed rear top wall section 12g, and a pair of side-by-side hinged or pivoted top wall sections 12h, 12i. The provided top wall sections 12h, 12i serve as access doors for the top of housing 12 and may be hingedly connected to the front edge of the fixed top wall section 12g.

In order to aid in positioning the main housing 12 upon the storage reservoir means 13, there is provided track means in the form of longitudinally extending substantially V-shaped rails 29a, 29b secured respectively to the bottom wall 12e of the main housing 12 and the top of the storage reservoir means 13 (FIGS. 2–5, 13, and 14). The rails 29a, 29b mate in the manner shown in FIG. 14A and aid in preventing lateral dislocation of the main housing 12 relative to the storage reservoir means 13.

The partitions which cooperate with the walls of housing 12 to define the compartments A–E are designated at 30–34, inclusive, and all of them extend substantially vertically from the bottom wall 12e to the composite top wall 12f of housing 12. As the partitions are arranged in FIG. 4 it will be observed that compartment A is defined on the left-hand end wall 12c and is defined on the right by partition 30 and a front portion of partition 31. Compartment A also is defined by that portion of front wall 12a extending between end wall 12c and partition 31 and by that portion of partition 32 extending from partition 31 to partition 30. The portion of housing rear wall 12b extending from end wall 12c to partition 30 defines the rear extremity of compartment A.

Although a portion of partition 31 extends rearwardly from partition 32 into compartment A for defining the juncture between the waste water settling compartment A′ and the first oil-water separation compartment A″, it is to be noted that the latter portion of partition 31 is provided with a relatively large filter or screened opening 31a (FIGS. 2–5, 8, 13 and 17) therethrough and adjacent the upper portion of the partition 31 so that the waste water may readily pass through opening 31a. Thus, the rear portion of partition 31 is, in effect, an intermediate partition or dividing wall only partially separating the water settling compartment A′ from the first oil-water separation compartment A″. The water settling compartment A′ also contains another intermediate partition or dividing wall 35 therein which is spaced about midway between left-hand end wall 12c of housing 12 and partition 31. Intermediate partition 35 extends vertically from bottom wall 12c to the top wall 12f of housing 12, and it extends forwardly from rear wall 12b to a point about three-fourths to seven-eighths the distance to the front wall 12a from the rear wall 12b (FIGS. 4 and 7), thus providing a substantial opening or passage 36 for flow of the waste water between the front edge of partition 35 and the front wall 12a of housing 12. In order that the successive stages of the method may be clearly understood, certain of the vertical partitions purposely are not identified by reference characters in the schematic illustration shown in FIG. 17.

The waste water is initially directed into the waste water settling compartment A' of the composite water settling and separation compartment A within the main housing 12, wherein the agitation and motion of the waste water is reduced so that the oil will begin to separate from the water. To enhance separation of the oil and water, the agitation and motion of the waste water is reduced by various means. First, the waste water is admitted into the settling compartment A' through a T-shaped pipe fitting or section of conduit 37 communicatively connected to the conduit 27 from the pump 20 within the sump 11. The T-shaped section 37 directs the waste water laterally outwardly above the level of the water in compartment A' while thereby diffusing the flow of the water and minimizing the forming of currents in the water in the compartment A'. The T-shaped section 37 is positioned above the operating level of the waste water within the settling compartment A' (FIG. 7) so as to discharge the waste water upon a cascade plate or tray 40 projecting inwardly from housing rear wall 12b.

Thus, the waste water must flow over the cascade tray 40 and down into the inlet end portion or section of settling compartment A' thereby providing further diffusion of the water. The waste water is also admitted to the settling compartment A' in the rear corner thereof (FIG. 4) and gravitationally flows forwardly between wall 12c and the partition or dividing wall 35. The partition 35 serves to increase the residence time of the waste water within the inlet end portion of settling compartment A' since the waste water is caused to flow around one end of the partition 35 and through the passage 36 as illustrated in FIG. 4. The dividing wall or partition 35 thus causes the waste water to flow in a somewhat serpentine path to increase the time that the water is present in the settling compartment A'. To further reduce agitation and motion of the waste water, baffles 41 (FIGS. 3, 4, 7, 8 and 14) direct the waste water upwardly adjacent passage 36 to enhance movement of the oil to the surface of the water. The baffles 41 are positioned within midportions of settling compartment A' and are inclined upwardly in the direction of flow of the waste water around the dividing wall 35 so that the waste water will be directed upwardly between the baffles 41. As preferred, some of the baffles 41 are positioned to extend between the front end portion of the partition or dividing wall 35 and the left-hand end wall 12c of housing 12. Others of the baffles 41 extend between partitions 31 and 35 adjacent the front end of partition 35.

The waste water flows from the settling compartment A' through the filter or screened opening 31a, which is located in the upper portion of the partition 31 (see FIG. 8) so that the partially separated oil and water will not become intermixed as it flows into the first oil-water separation compartments A" and so that any sludge or sediment which has been deposited on the bottom of the settling compartment will not be transferred therefrom. Thus, the opening 31a extends downwardly from above the surface of the waste water to a level approximately midway of the height of the composite compartment A. The filter or screen is provided at the opening 31a to prevent floating objects of a larger size than the oil particles, such as scraps of paper and the like, from passing out of the settling compartment A'.

In the first oil-water separation compartment A", further gravitational separation of the oil from the water takes place and most of the oil is removed from the surface of the water and directed to the compartment C. Thus, compartment C may be termed as an "oil collection compartment". The water is the first oil-water separation compartment A" is directed to compartment B which may be termed a "second oil-water separation compartment" and which effects further gravitational separation of the oil and water and removal of the oil from the surface of the water.

The oil removed in the second separation compartment B is also directed into the oil collection compartment C, and the water is directed from the second separation compartment B into the compartment D, which thus may be termed as a "water collection compartment".

To remove the oil and other similar lighter than water contaminants from the surface of the water in the first and second oil-water separation compartments A" and B, first and second drains 60, 61 (FIGS. 3, 4, 9–11, 13, 14 and 17) are positioned respectively within the first and second separation compartments A", B. The drains 60, 61 are communicatively connected to the oil collection compartment C by respective conduits 62, 63 so as to direct separated oil into the oil collection compartment C by gravity. As shown in the illustration of drain 60 in FIG. 6, the drains 60, 61 (which may be identical) are generally funnel-shaped and have respective upwardly open mouths. Additionally, each drain 60, 61 is frictionally slideably mounted on its respective conduit 62, 63 so as to be vertically adjustable thereon.

The mouths of the drains 60, 61 are positioned at relatively different levels or heights with respect to each other to aid in obtaining an accumulation of a substantial layer of oil at the upper surface of the waste water in the first oil-water separation compartment A" and so that the oil will not flow into the drain 60 until a layer of separated oil of predetermined minimum thickness or depth is floating on the surface of the water, whereupon the layer of oil, virtually free of any water mixed therewith, will flow into the drain 60. Accordingly, the mouth of the drain 61 in the second oil-water separation compartment B is located below the level of the mouth of the drain 60 in the first separation compartment A", and drain 61 is positioned so as to be at the same level as the surface of the water when the second separation compartment B is substantially filled. On the other hand, the mouth of the drain 60 in the first oil-water separation compartment A" is positioned so as to be adjacent but above the surface of the water when said compartment is substantially filled with water for removing separated oil floating on the surface of the water therein.

It is important that the drain 61 in the second oil-water separation compartment is positioned below drain 60 so that whenever the level of the waste water in the second separation compartment B reaches the level of the mouth of drain 61, the level of the body of the waste water in the first separation compartment A" will be below the level of the mouth of drain 60. In other words, if the second separation compartment B is substantially filled with waste water, to the extent that the waste water overflows or is skimmed into the drain 61 and thus flows into the oil collection compartment C, the level of the waste water in the first separation compartment A" will reach a maximum height somewhat less than that of the mouth of drain 60. In practice it has been found that the difference between the maximum height of the water level in the first separation compartment and the mouth of the drain 60 associated therewith should be in the range of about ⅛ inch (3.18 mm) to about ¼ inch (6.35 mm).

As will be later described, means are provided for restricting the flow of waste water from the first oil-water separation compartment A" into the second separation compartment so as to effect an increased residence time or dwell time for the waste water in the first separation compartment A" to increase the time during which the oil in the mass of the waste water present in the first compartment A" may migrate or rise to the surface of the waste water. The restricting of the flow of waste water from compartment A" into compartment B causes the waste water to flow into second compartment B at a slower rate than that at which the waste water is normally admitted into the first compartment A", thus causing the water to back up in the first compartment A" and thus present a higher water level in the first compartment than that in the second compartment. The maximum height of the surface of the water upon which the separated oil floats in the first separation compartment should never be any higher than about ⅛ to ¼ inch (3.18 to 6.35 mm) below the mouth of drain 60 therein. It follows that the layer of oil floating on the surface of the water in the first separation compartment A" will have a minimum thickness of about ⅛ to ¼ inch (3.18 to 6.35 mm) before flowing into the mouth of the drain 60. In an actual apparatus constructed in accordance with this invention it was determined that the water level in the first compartment was about one inch (25.4 mm) higher than the water level in the second compartment due to the restriction flow therebetween, with the mouth of the drain 60 in the first oil-water separation compartment A" being positioned approximately 1¼ inches (31.75 mm) above the level of the mouth of the drain 61 in the second oil-water separation compartment B.

With the foregoing description of the compartments A", B and drains 60, 61 in mind, it is to be noted that oil will accumulate on the surface of the water in the first separation compartment A" until a layer or head of oil of predetermined minimum thickness or depth is built up on the surface of the water to the level of the mouth of drain 60, whereupon the oil will flow into the drain 60. The cohesion of the oil particles and the capillary action at the mouth of the drain 60 will cause the oil to continue to flow into the drain 60 until a substantial portion of the layer of oil is removed. Thereupon, the flow of oil into drain 60 ceases until another layer of oil of predetermined thickness accumulates on the water. In the use of the actual apparatus mentioned above, a layer of oil of approximately ¼ inch (6.35 mm) thickness accumulated on the surface of the water in the first separation compartment in approximately three to four hours of operation. Thus, actual removal of the oil from the surface of the water by draining into drain 60 occurred for a brief interval once in about every three to four hours. The rate at which the oil accumulated, however, depended upon the concentration of oil in the waste water and the amount of waste water admitted to the main housing 12. Thus, the frequency at which the oil was removed varied accordingly.

The restricted flow of waste water from the first separation compartment A" to the second separation compartment B is effected through a conduit 70 communicatively interconnecting the separation compartments A", B in such a manner that water substantially free of oil is directed into the second separation compartment B. To this end, conduit 70 has an inlet end 71 which is positioned adjacent the bottom portion of the first separation compartment A". Thus, predominantly water, with minimal emulsified oil mixed therewith, enters the conduit inlet end 71, since the oil and water will have substantially separated within the lower, downstream portion of the first separation compartment A". The outlet end 72 of conduit 70 is T-shaped to direct the waste water laterally outwardly so as to minimize agitation of the waste water and intermixing of the oil and water. The outlet end 72 is positioned closely adjacent and below the surface of the water in the second separation compartment B as shown in FIGS. 9 and 14 so that any oil particles therein are near the surface of the water, thus reducing the time which may be required for the oil particles to rise to the surface of the water in compartment B. It follows that discharge of the waste water closely adjacent the surface aids in reducing the amount of oil intermixed with the water when directed from the second separation compartment B.

While in the second separation compartment B, the waste water undergoes further gravitational separation, and the oil at the surface of the water is periodically removed by being skimmed into drain 61 while the water in the second separation compartment B is periodically discharged into the water collection compartment D. By periodically or discontinuously discharging the water from the second separation compartment B, rather than continuously removing the water, as by a continuous gravitational flow, the residence or dwell time of the waste water within the second separation compartment B is increased, thereby providing additional time for separation of the emulsified oil from the water. Thus, water discharge means comprising a pump 73 is associated with the second separation compartment B to discontinuously remove the water therefrom. The pump 73 is positioned within the second separation compartment B and has an inlet 73' (FIGS. 4 and 9) distally positioned relative to the outlet end 72 of the conduit 70, and preferably located, as shown, well below the level of the mouth of the drain 61 and within the lower portion of the second separation compartment B. The inlet 73' of the water discharge means or pump 73 is distally positioned with respect to the outlet end 72 of conduit 70 to aid in minimizing the introduction of water, which may contain some emulsified oil, from the outlet end 72 of conduit into the inlet 73' of pump 73 until some time has elapsed for the separation of the oil and water in compartment B. Thus, the pump 73 discharges the relatively clean water from the lower portion of the second separation compartment B into the water collection compartment D via a conduit 74.

To effect discontinuous or periodic operation of pump 73, so as to discontinuously or periodically discharge water from the second separation compartment B, water level sensing means 80 is operably associated with the pump 73 for periodically actuating the pump 73 in response to the level of the water within the second separation compartment B. The water level sensing means 80 senses the height of the water in the second separation compartment B rising to the height of the mouth of the drain 61 with a small amount of oil and water thus being skimmed into the drain 61 and then actuates the pump 73 thus causing the pump to draw the water down to a predetermined lower level, for example, about 1¾ to 2 inches (44.45 to 50.8 mm) below the mouth of the drain 61.

More specifically, the water level sensing means 80 comprises a float 81 (FIG. 16) which moves vertically in response to the level of the water in the second separation compartment B and which actuates a switch 82 that opens and closes a circuit connecting the pump 73 to a power source, not shown. As shown in FIG. 16 a vertically extending mounting bolt 83 is secured to the top of float 81 and slideably engages a switch lever 84 that operates the switch 82. As the float 81 rises with the water, a nut 85a threaded onto the mounting bolt 83 abuts switch lever 84, moving the same to an "on" position to actuate pump 73. The float 81 is vertically adjusted by turning nut 85a so that switch 82 will close when the level of the water in the second separation compartment B is at the mouth of the drain 61 and after the liquid in the second separation compartment B has begun to flow into the drain 61. Following actuation of the pump 73, the pump continues to operate, discharging water from the second separation compartment B until float 81 drops sufficiently to deactivate the switch 82. Thus, as the float 81 moves downwardly, the mounting bolt 83 slides through the switch lever 84 until the nut 85b adjacent the top of the mounting bolt 83 engages the switch lever 84 and moves the lever to an "off" position by the weight of the float. An additional weight means 86 may be mounted on float 81 if the weight of the float is insufficient for operating switch 82.

By removing the water from the second separation compartment B in this discontinuous manner, emulsified oil passing into the second separation compartment B is afforded an additional period of time to separate from the water and rise to the surface of the water for removal by flowing into the drain 61. However, since most of the oil is accumulated in the first separation compartment A″ and removed at that location, only minute quantities of oil are removed in the second separation compartment B. Thus, although residual amounts of water are removed with the oil in the second separation compartment B, the additional residence period of time for separation increases the amount of oil with respect to the water that is removed.

Since it is desirable to discharge only substantially oil-free water from the second separation compartment B, into the water collection compartment D, precise operation of the pump 73 in response to the level of the water in the second separation compartment B is highly desirable. Thus, a protective member or shield 87 (FIGS. 14 and 16), comprising a section of pipe mounted to the partition 32, may be provided which surrounds the float 81 so that agitation of the water will not prematurely activate or deactivate the switch 82. Furthermore, the protective member 87 extends downwardly into the water within the second separation compartment B and below the outlet end 72 of the conduit 70. The protective member 87 thus prevents oil from accumulating around the float 81 and interfering with proper operation of the water level sensing means 80.

As indicated above, the water is discharged from the second separation compartment B, into water collection compartment D where further separation of residual oil, if any is present, takes place. Thus, the pump 73 discharges the water through conduit 74 into the water collection compartment D and through the conduit's outlet end 90, which may be T-shaped to aid in minimizing agitation of the water within the water collection compartment D. Also, the portion of the conduit 74 within the water collection compartment D may be U-shaped to form a trap for the water and prevent entrance of air into conduit 74, as well as to aid in minimizing agitation of the effluent.

From the water collection compartment D, the water is discharged into compartment E, which may be termed as a "water inspection compartment", wherein samples of the water may be taken to determine the amount of oil, if any, remaining in the water. Compartment E also permits further settling of the water if necessary. To discharge the water from the water collection compartment D into compartment E, a conduit 92 is positioned within the water collection compartment D so that water will gravitationally flow into the water inspection compartment E (see FIG. 12). Thus, as shown in FIG. 12, the inlet end 93 of the conduit 92 is positioned within the lower portion of the water collection compartment D, and the outlet end 94 discharges the water into the water inspection compartment E at a position within the upper portion of the inspection compartment. At that point, samples of the water may be taken. From the water inspection compartment E, the water is discharged through a conduit 95 having an inlet end 96 within the lower portion of the inspection compartment. Conduit 95 passes through the end wall 12d of main housing 12 at a point above the midportion of the wall 12d. Thus, water is allowed to collect within inspection compartment E before the water is gravitationally discharged therefrom.

Referring to the oil collection compartment C and as shown most clearly in FIGS. 4 and 11, it is there shown that the oil collection compartment C is adapted to receive separated oil from the first and second oil-water separation compartments A″, B so that any remaining residual water intermixed with the oil can separate prior to removal of the oil from the oil collection compartment C. Thus, there is provided means associated with the oil collection compartment C for removing the oil from the residual water and including a drain 100, similar to drain 60 of FIG. 6, having a mouth adapted to be located adjacent the surface of the oil which floats to the surface of the residual water. Thus, as the level of the oil within the oil collection compartment C rises, the oil flows into the drain 100 and is discharged from the oil collection compartment C through a conduit 102 passing through the rear side wall 12b.

The residual water which accumulates in the oil collection compartment C is discharged therefrom in a discontinuous manner so that adequate separation of the residual water from the oil is permitted. Water discharge means comprising a pump 103 is associated with the oil collection compartment C to remove the residual water therefrom, and as best shown in FIG. 11, the inlet 104 for the pump 103 is positioned closely adjacent the bottom of the oil collection compartment C so that substantially oil-free residual water will be discharged. There is also included level sensing means 105 operably associated with pump 103 for periodically actuating the pump in response to the level of the oil in the oil collection compartment C. When the height of the oil in the oil collection compartment C rises to the mouth of drain 100 and starts to flow therein, the level sensing means 105 actuates pump 103, causing the pump to draw the water down so as to obtain a predetermined lower level of the oil below the mouth of drain 100. In this manner, the residual water is removed from the separated oil and the oil discharged from the oil collection compartment C includes minimal intermixed water therewith.

In the embodiment shown in FIGS. 11 and 15, the pump 103 includes a self-contained level sensing means 105. Pump 103 is mounted on the partition 33 substantially level with the mouth of drain 100 and includes a main housing 106 having a fluid collection chamber 107 into which residual water is admitted via inlet 104. As the level of the oil outside chamber 107 rises or falls, the residual water within chamber 107 gravitationally rises and falls in response thereto. Thus, the level sensing means 105, which includes a float 108, senses the height of the oil in the oil collection compartment to actuate the pump 103 as described above.

The residual water discharged from oil collection compartment C is recycled to the waste water settling compartment A' for reprocessing through the oil-water separation compartments A", B to remove substantially all the oil from the water. To discharge the residual water in this manner, a conduit 109 connects the outlet of pump 103 to the settling compartment A' (FIGS. 3, 4, 11 and 17).

From the main housing 12, the separated water and oil are discharged to the auxiliary housing or storage reservoir means 13 wherein the oil is retained for final disposal and wherein the water is retained for subsequent reuse or discharge into a sewage disposal system. The storage reservoir means 13 is constructed in a manner similar to the construction of the main housing 12 and includes a common partition wall 120 defining the oil tank 13a and the water tank 13b. In the illustrated embodiment, and as shown in FIG. 2, the partition wall 120 divides the storage reservoir means 13 so that the water tank 13b has approximately twice the capacity of the oil tank 13a. Under typical operating conditions, adequate capacity for the oil is thereby provided, and since little water is present in the processed effluent, only occasional removal of the accumulated oil from tank 13a may be required.

The oil from oil collection compartment C and the water from the water inspection compartment E are discharged respectively into the oil tank 13a and the water tank 13b. Thus, the conduit 102 from drain 100 in oil collection compartment C communicates with the top of the oil tank 13a, and conduit 95 within the water inspection compartment E communicates with the top of water tank 13b. The oil in oil tank 13a is collected for disposal when a sufficient quantity is accumulated. The water, however, may be reused or discharged into a sewage disposal system, and a conduit 123 (FIGS. 2 and 5) having an inlet 124 positioned within the lower portion of the water tank 13b is provided for that purposes. By drawing the water from the lower portion of the water tank 13b, additional protection is provided against discharge of oil from oil-water separator 10 intermixed with the water.

Visual inspection of the interior of oil tank 13a and water tank 13b may be desired for checking the levels of the oil and water and for sampling the contents within the tanks. Therefore, there is provided tank access covers 130 which cover suitable openings in the top wall portions of the tanks 13a, 13b and which may be lifted for visual determination of the contents of the tanks 13a, 13b.

Also, protective devices are provided to prevent spillage of oil and to maintain proper functioning of the oil-water separator 10. As illustrated schematically in FIG. 17, an oil level alarm 131 is associated with oil tank 13a to provide a signal when the amount of oil within oil tank 13a approaches the capacity of the tank. The oil level alarm 131 may include a flotation switch 132 which activates a bell 133 or other audible or visual alarm when the level of the oil rises to a level near the top of the oil tank 13a. Other protective devices include tank covers 130 which loosely fit over the openings in the tops of the tanks 13a, 13b and which are held in place by their own weight. Thus, if the capacity of either of the tanks 13a, 13b is exceeded, the liquid will flow out of the opening in the top of the respective tank rather than backing up into the main housing 12.

Proper operation of the oil-water separator may be enhanced by periodic cleaning of the main housing 12, and for that purpose, plugs 134 (FIG. 2) are provided in the lower portions of the settling compartment A' and the water collection compartment D. Also, in colder climates, one or more electrical heating elements 135 may replace the plugs 134 to prevent the waste water from freezing.

In the drawings and specification, there has been set forth a preferred embodiment of this invention, and although specific terms are employed, they are used in a generic and descriptive sense only and not for purposes of limitation.

That which is claimed is:

1. An oil-water separator for removing oil and other similar contaminants from waste water and comprising:
   means defining a first oil-water separation compartment adapted to receive waste water containing oil and other similar lighter than water contaminants,
   means associated with said first compartment for removing separated oil from the surface of the water in said compartment and including a drain having its mouth located so as to be adjacent but above the surface of the water when said compartment is substantially filled with water for removing separated oil floating on the surface of the water therein,
   means defining a second oil-water separation compartment,
   conduit means communicatively connecting said first oil-water separation compartment to said second oil-water separation compartment and restricting the flow of water from said first to said second oil-water separation compartment so as to increase the residence time of the water in the first oil-water separation compartment to thereby increase the separation of oil therein,
   said conduit means having an inlet end positioned in a lower region of said first oil-water separation compartment and an outlet end positioned in said second oil-water separation compartment,
   means associated with said second oil-water separation compartment for removing the separated oil from the water therein and including a drain having its mouth located below the level of the mouth of the drain associated with said first oil-water separation compartment,
   water discharge means, including an inlet end within said second oil-water separation compartment, for discontinuously removing water therefrom at a location below the level of the drain therein, said inlet end of said water discharge means being distally positioned relative to said outlet end of said conduit means, and water level sensing means operably associated with said water discharge means for periodically actuating the same in response to sensing the height of the water in said second compartment being at the mouth of said drain therein and for in turn causing the water discharge means to draw the water down to predetermined lower level below the mouth of the drain, whereby the restricted flow of water from the first to the second compartment, the higher location of the mouth of the drain associated with the first compartment, as compared to the lower location of the drain associated with the second compartment, and the discontinuous removal of water from the second compartment result in obtaining a greater accumulation of oil in the first compartment and the removal of a greater amount of oil at that location, as well as an overall increase in residence time of the water in the compartments so as to thereby enhance overall removal of oil with minimal intermixed residual water.

2. The oil-water separator as defined in claim 1 further including means defining an oil collection compartment, and said means associated with said first and second oil-water separation compartments for removing separated oil including respective conduit means communicatively connecting said respective drains therein to said oil collection compartment.

3. The oil-water separator as defined in claim 2 further including;

means associated with said oil collection compartment for removing the oil from residual water therein and including a drain having its mouth adapted to be located adjacent but above the surface of the residual water when said oil collection compartment is substantially filled, for removing separated oil floating on the surface of the residual water therein, residual water discharge means associated with said oil collection compartment for removing residual water therefrom, sensing means operably associated with said residual water discharge means for periodically actuating the same in response to sensing the height of the separated oil in said oil collection compartment being at the mouth of said drain therein and for in turn causing the residual water discharge means to draw the water down to a predetermined lower level below the mouth of said drain, whereby residual water removed with the separated oil from said first and second oil-water separation compartments is further separated from the oil so as to further enhance removal of oil with minimal intermixed water.

4. The oil-water separator as defined in claim 3 wherein said residual water discharge means comprises a pump and a conduit having an outlet end associated with said first oil-water separation compartment for recycling residual water thereto, whereby the residual water is intermixed with the waste water and reprocessed through said oil-water separation compartments to remove substantially all of the oil from the water.

5. The oil-water separator as defined in claim 1, wherein said conduit means for flow of water from said first to said second oil-water separation compartment has its outlet end positioned closely adjacent and below the surface of water in said second compartment for facilitating separating the oil from the water therein, and said outlet end has outwardly laterally directed openings to minimize agitation of the water in said second oil-water separation compartment to thereby lessen the amount of water flowing into said drain associated with said second oil-water separation compartment.

6. The oil-water separator as defined in claim 1 further including means defining an oil collection compartment, said means associated with said first and second oil-water separation compartments for removing separated oil including respective conduit means communicatively connecting said respective drains therein to said oil collection compartment, means associated with said oil collection compartment for removing the oil from the residual water therein and including a drain having its mouth adapted to be located adjacent the surface of the oil floating on the residual water, and means associated with said oil collection compartment for sensing the height of the oil in said oil collection compartment being at the mouth of said drain therein and for in turn causing residual water to be drawn from the oil collection compartment to a predetermined lower level below the mouth of said drain therein, whereby the residual water removed with the separated oil from said first and second oil-water separation compartments is further separated from the oil to further enhance the removal of oil with minimal intermixed residual water.

7. An oil-water separator for removing oil and other similar contaminants from waste water and comprising:

means defining a first oil-water separation compartment adapted to receive waste water containing oil and other similar lighter than water contaminants, means associated with said first compartment for removing separated oil from the surface of the water in said compartment and including a drain having its mouth located so as to be adjacent but above the surface of the water when said compartment is substantially filled with water for removing separated oil floating on the surface of the water therein, means defining a second oil-water separation compartment, conduit means having an inlet end communicating with said first oil-water separation compartment and an outlet end communicating with said second oil-water separation compartment and restricting the flow of water from the first to the second compartment, said inlet end of said conduit being positioned adjacent a lower portion of said first compartment and said outlet end of said conduit being positioned so as to be closely adjacent and below the surface of the water in the second compartment so that the oil present in the water flowing from the first compartment into the second compartment will be directed into upper portions of the water therein to facilitate the separation of the oil from the water, means associated with said second compartment for removing the separated oil from the waste water therein and including a drain having a mouth located below the level of the mouth of the drain associated with said first compartment, pump means associated with said second compartment for periodically removing water therefrom at a location below the level of the drain therein, water level sensing means operably associated with said pump means for periodically actuating the same in response to sensing the height of the water in said second compartment being at the mouth of said drain therein and for in turn causing the pump means to draw the water down to a predetermined lower level below the mouth of said drain, means defining an oil collection compartment, said means associated with said first and second oil-water separation compartments for removing separated oil including respective conduit means communicatively connecting said respective drawings therein to said oil collection compartment for thus directing separated oil and residual water to said oil collection compartment, means associated with said oil collection compartment for removing the oil from the residual water therein and including a drain having its mouth adapted to be located adjacent the surface of the oil floating on the residual water, residual water pump means associated with said oil collection compartment for removing residual water therefrom, sensing means operably associated with said residual water pump means for periodically actuating the same in response to sensing the height of the oil in said oil collection compartment being at the mouth of said drain therein and for in turn causing the residual water pump means to draw the water down to a predetermined lower level below the mouth of said drain, and conduit means associated with said residual water pump means for receiving the residual water and directing the same to said first oil-water separation compartment whereby the residual water removed from the oil collection compartment is recycled to thereby reduce the residual water intermixed with the oil in the oil collection compartment.

8. An oil-water separator for removing oil and other similar contaminants from waste water and comprising:

means defining a first oil-water separation compartment adapted to receive a flow of waste water containing oil and other similar lighter than water contaminants, said first oil-water separation compartment including a water settling portion wherein the waste water gravitationally settles into constituent layers of oil, water and sludge, means associated with said first oil-water separation compartment for removing separated oil from the surface of the water therein and including a drain having its mouth located so as to be adjacent but above the surface of the water when the compartment is substantially filled with water, for removing separated oil floating on the surface of the water therein, means defining a second oil-water separation compartment adapted to receive water therein, conduit means communicatively connecting said first and second oil-water separation compartments and restricting the flow of water from said first to said second oil-water separation compartment so as to increase the residence time of the water in the first oil-water separation compartment to thereby increase the separation of oil therein, said conduit means having an inlet end adjacent bottom portions of said first oil-water separation compartment for collecting predominantly water therefrom and an outlet end closely adjacent but below the surface of water in said second oil-water separation compartment for discharging the water therein, means associated with said second oil-water separation compartment for removing the separated oil from the waste water therein and including a drain having its mouth located below the level of the mouth of the drain in said first separation compartment, water discharge means associated with said second oil-water compartment for discontinuously removing water therefrom at a location below the surface of the level of the drain therein, water level sensing means operably associated with said water discharge means for periodically actuating the same in response to sensing the height of the water in said second oil-water separation compartment being at the mouth of said drain therein and for in turn causing the water discharge means to draw the water down to a predetermined lower level below the mouth of said drain, and means defining a water collection compartment communicatively connected to said water discharge means for receiving water from said second oil-water separation compartment and wherein residual oil that may pass into said water collection compartment is accumulated on the surface of the water, whereby the restricted flow of water from the first to the second compartment, the higher location of the mouth of the drain associated with the first separation compartment, as compared to the lower location of the drain associated with the second separation compartment, and the discontinuous removal of water from the second separation compartment result in obtaining a greater accumulation of oil in the first compartment and the removal of a greater amount of oil at that location, as well as an overall increase in residence time of the water in the compartments so as to thereby enhance overall removal of oil with minimal intermixed residual water.

9. The oil-water separator as defined in claim 8, wherein said water settling portion of said first oil-water separation compartment includes baffle means mounted therein to deflect waste water upwardly as it flows therethrough so as to reduce agitation of the waste water and to aid in the gravitational separation from the water of the oil and sludge forming precipitates.

10. The oil-water separator as defined in claim 8 including filter means positioned in said first oil-water separation compartment between said water settling portion, and the remainder thereof for blocking passage of floating objects of a large size relative to the oil particles in the waste water.

11. The oil-water separator as defined in claim 8 including heating means associated with at least one of said first and second oil-water separation compartments for being utilized during cold weather to prevent the water from freezing and interrupting operation.

12. An oil-water separator for removing oil and other similar lighter than water contaminants from waste water and comprising:

means defining a sump for receiving and containing waste water therein, said sump having a closed lower portion wherein sludge and other precipitates are deposited;

waste water discharge means associated with said sump for removing the waste water therefrom at a location below the surface of the water and above the bottom of the sump;

waste water level sensing means operably associated with said waste water discharge means for periodically actuating the same in response to sensing the height of the water in said sump being at a predetermined level and for in turn causing the waste water discharge means to draw the waste water down to a predetermined lower level;

means defining a first oil-water separation compartment communicatively connected to said waste water discharge means for receiving a flow of waste water from said sump, said first oil-water separation compartment including a water settling portion wherein the waste water gravitationally settles into constituent layers of oil, water and sludge;

means associated with said first oil-water separation compartment for removing separated oil from the surface of the water therein and including a drain having its mouth located so as to be adjacent but above the surface of the water when said first oil-water separation compartment is substantially filled with water for removing separated oil floating on the surface of the water therein;

means defining a second oil-water separation compartment, conduit means communicatively connecting said first oil-water separation compartment to said second oil-water separation compartment and restricting the flow of water from said first to said second oil-water separation compartment so as to increase the residence time of the water in the first oil-water separation compartment to thereby increase the separation of oil therein, said conduit means having an inlet end positioned in a lower region of said first oil-water separation compartment and an outlet end positioned in said second oil-water separation compartment, means associated with said second oil-water separation compartment for removing the separated oil from the waste water therein and including a drain having its mouth located below the level of the mouth of the drain associated with said first separation compartment;

means defining an oil collection compartment for receiving separated oil and residual water from said first and second oil-water separation compartments, said drains associated with said first and second oil-water separation compartments being communicatively connected to said oil collection compartment so as to discharge the separated oil at a location below the surface of the water in said oil collection compartment;

water discharge means, including an inlet end within said second oil-water separation compartment, for discontinuously removing water therefrom at a location below the surface of the level of the drain therein, said inlet end of said water discharge means being distally positioned relative to said outlet end of said conduit means, and water level sensing means operably associated with said water discharge means for periodically actuating the same in response to sensing the height of the water in said second oil-water separation compartment being at the mouth of said drain therein and for in turn causing the water discharge means to draw the water down to a predetermined lower level below the mouth of said drain, whereby the restricted flow of water from the first to the second compartment, the higher location of the mouth of the drain associated with the first separation compartment, as compared to the lower location of the drain associated with the second separation compartment, and the discontinuous removal of water from the second separation compartment result in obtaining a greater accumulation of oil in the first compartment and the removal of a greater amount of oil at that location, as well as an overall increase in residence time of the water in the compartments so as to thereby enhance overall removal of oil with minimal intermixed residual water.

13. An oil-water separator as defined in claim 12 further including an oil storage tank communicatively connected to said oil collection compartment for receiving separated oil therefrom and for retaining the oil for final disposal.

14. An oil-water separator for removing oil and other similar contaminants from waste water and comprising:

a main housing, an auxiliary housing underlying said main housing with the main housing being restingly received upon the auxiliary housing, said main housing being divided into a plurality of compartments, and comprising:

means defining a first oil-water separation compartment adapted to receive waste water containing oil and other similar lighter than water contaminants, means defining a second oil-water separation compartment, and means defining an oil collection compartment, said auxiliary housing comprising an oil storage compartment, means associated with said first oil-water separation compartment for removing separated oil and directing the same to said oil collection compartment and including a drain having its mouth located so as to be adjacent but above the surface of the water when said first oil-water compartment is substantially filled with water for removing separated oil floating on the surface of the water therein;

conduit means communicatively connecting said first oil-water separation compartment to said second oil-water separation compartment and restricting the flow of water from said first to said second oil-water separation compartment so as to increase the residence time of the water in the first oil-water separation compartment to thereby increase the separation of oil therein, said conduit means having an inlet end positioned in a lower region of said first oil-water separation compartment and an outlet end positioned in said second oil-water separation compartment, means associated with said second oil-water separation compartment for removing the separated oil from the water therein and directing the same into said oil collection compartment and including a drain having its mouth located below the level of the mouth of the drain associated with said first oil-water separation compartment, means including a pump having an inlet end within said second oil-water separation compartment, for periodically removing water therefrom at a location below the level of the drain therein, said inlet end of said pump being distally positioned relative to said outlet end of said conduit means, water level sensing means operably associated with said pump for periodically actuating the same in response to sensing the height of the water in said second oil-water separation compartment being at the mouth of said drain therein and for in turn causing said pump to draw the water down to a predetermined lower level below the mouth of said drain, means associated with said oil collection compartment for removing the oil from the residual water therein and directing the same to said oil storage compartment and including a drain having its mouth adapted to be located adjacent the surface of the oil floating on the residual water in said oil collection compartment, residual water pump means associated with said oil collection compartment for removing residual water therefrom, sensing means operably associated with said residual water pump means for periodically actuating the same in response to sensing the height of the oil in said oil collection compartment being at the mouth of said drain therein and for in turn causing the residual water pump means to draw the water down to a predetermined lower level below the mouth of the drain, and conduit means associated with said residual water pump means for directing the residual water to said first oil-water separation compartment whereby the residual water removed from the oil collection compartment is recycled to thereby reduce the residual water intermixed with the oil in the oil collection compartment.

15. An oil-water separator as defined in claim 14 including cooperating track means provided on the underside of said main housing and the upper surface of said auxiliary housing for aiding in positioning the main housing upon the auxiliary housing and for further aiding in preventing lateral dislocation of the housings relative to each other.

16. A method of removing oil and other similar contaminants from waste water and comprising, directing the waste water into a first oil-water separation compartment while permitting the waste water to restrictively flow from a lower region of the first compartment into an upper region of a second oil-water separation compartment by gravitational flow positioning respective drains in the oil-water separation compartments with the mouths of the drains being adjacent the surface of the water and adjusting the relative position of the drains so that the mouth of the drain in the first compartment is positioned and maintained at a higher level than the mouth of the drain in the second compartment and also is positioned above the level of the water in the first compartment so as to accommodate a layer of separated oil floating on top of the water in the first compartment, and periodically, upon the level of water in the second compartment rising to a height so as to flow into the drain therein, removing water from a lower region of the second compartment to draw the water down to a predetermined lower level, whereby the restricted flow of the water from the first to the second compartment, the higher location of the mouth of the drain associated with the first compartment and the discontinuous or periodic removal of water from the second compartment result in obtaining a greater accumulation of oil in the first compartment and the removal of a greater amount of oil at that location, as well as an overall increase in residence time of the water in the compartments so as to thereby enhance the overall removal of oil with minimal intermixed residual water.

17. A method according to claim 16 including directing the oil and residual water flowing into the respective drains of the first and second oil-water separation compartments into an oil collection compartment provided with a drain positioned at a level above the height of the residual water therein so as to accommodate a layer of collected oil floating on top of the residual water and thus minimize residual water flowing into the drain with the collected oil, and periodically pumping residual water from a lower region of the oil collection compartment and redirecting the same into the first oil-water separation compartment to recycle the same and to thereby reduce the residual water intermixed with the oil in the oil collection compartment.

* * * * *

UNITED STATES PATENT AND TRADEMARK OFFICE
CERTIFICATE OF CORRECTION

PATENT NO. : 4,246,113
DATED : January 20, 1981
INVENTOR(S) : Robert H. Mausgrover It is certified that error appears in the above–identified patent and that said Letters Patent are hereby corrected as shown below:

After the "Abstract", "18 Drawing Figures" should be --17 Drawing Figures--.

Column 2, Line 6, "wear" should be --water--; Line 12, "petroleum" should be --problems--; Line 24, after "one" insert --oil--; Line 42, "IT" should be -- It --.

Column 5, Line 17, "retaining" should be --resting--.

Column 6, Line 14, "provided" should be --pivoted--.

Column 7, Line 60, "compartments" should be --compartment--

Column 8, Line 8, "is" should be --in--.

Column 13, Line 54, "purposes" should be --purpose--.

Column 15, CLAIM 1, Line 7, before "predetermined" insert --a--.

Column 17, CLAIM 7, Line 15, "drawings" should be --drains--.

Signed and Sealed this

Twenty-sixth Day of May 1981

[SEAL]

Attest:

RENE D. TEGTMEYER

Attesting Officer    Acting Commissioner of Patents and Trademarks